United States Patent
Chen et al.

(10) Patent No.: US 8,717,964 B2
(45) Date of Patent: May 6, 2014

(54) WIRELESS WIDE-AREA COMMUNICATION NETWORK MULTIHOP RELAY STATION MANAGEMENT

(75) Inventors: David T. Chen, Palatine, IL (US); Matt J. Dillon, Boulder, CO (US)

(73) Assignee: Motorola Solutions, Inc., Schaumburg, IL (US)

( * ) Notice: Subject to any disclaimer, the term of this patent is extended or adjusted under 35 U.S.C. 154(b) by 1885 days.

(21) Appl. No.: 11/684,024

(22) Filed: Mar. 9, 2007

(65) Prior Publication Data

US 2008/0219214 A1    Sep. 11, 2008

(51) Int. Cl.
*H04B 7/14* (2006.01)

(52) U.S. Cl.
USPC ............ 370/315; 370/311; 370/252; 370/254

(58) Field of Classification Search
USPC .................................. 370/311, 315, 252, 254
See application file for complete search history.

(56) References Cited

U.S. PATENT DOCUMENTS

| | | | |
|---|---|---|---|
| 2006/0092898 A1* | 5/2006 | Kim et al. ........... | 370/338 |
| 2006/0215581 A1* | 9/2006 | Castagnoli ........... | 370/254 |
| 2007/0019598 A1* | 1/2007 | Prehofer ............ | 370/338 |
| 2007/0184869 A1 | 8/2007 | Koo et al. | |
| 2008/0117854 A1* | 5/2008 | Saifullah et al. ....... | 370/315 |
| 2008/0298292 A1* | 12/2008 | Jang ............... | 370/311 |

FOREIGN PATENT DOCUMENTS

| | | |
|---|---|---|
| JP | 2005184285 A | 7/2005 |
| KR | 100650398 B1 | 11/2006 |
| WO | 2008004099 A | 1/2008 |

OTHER PUBLICATIONS

IEEE 802.16J-06/016R1, Title: Proposed Technical Requirements Guideline for IEEE 802.16 Relay TG, Date submitted Oct. 11, 2006.*
Loa et al., IEEE C802.16J-07/066, Title: RS Sleep Mode, Date Submitted Jan. 8, 2007.*
Hongku Shi et al.: "Analysis of Relay Enhanced Cellular System's Power Saving Characteristic", Vehicular Technology Conference, 2006, VTC-2006 Fall, 2006 IEEE 64th, IEEE, PI, Sep. 1, 2006, pp. 1-5.
Negi A et al.: "Power Saving Approaches in 2-hop Relaying Cellular Networks", Personal, Indoor and Mobile Radio Communications, 2005, PIMRC 2005, IE EE 16th International Symposium on Berlin, Germany Sep. 11-14, 2005, Piscataway, NJ, USA, IEEE, vol. 3, pp. 1616-1620.
Jee-Young Song et al.: "Power consumption reduction by multi-hop transmission in cellular networks", Vehicular Technology Conference, 2004, VTC2004-Fall, 2004 IEEE 60th Los Angeles, CA, USA Sep. 26-29, 2004, Piscataway, NJ, USA, IEEE, vol. 5, pp. 3120-3124.

(Continued)

*Primary Examiner* — Manpreet Matharu
(74) *Attorney, Agent, or Firm* — Steven A. May

(57) ABSTRACT

A system and method for managing a multihop relay station in a wireless wide-area communication network includes determining whether any mobile stations are being served by the relay station. If not, inactivating the relay station by; inactivating transmitted signals from the relay station, leaving a receiver active, and monitoring signals on the active receiver. Whereafter, estimating a channel quality of at least one mobile station from the monitored signals by the inactive relay station, and activating the relay station in response to the monitored signals indicating that a channel quality of the mobile station will improve when being served by the relay station.

11 Claims, 4 Drawing Sheets

(56) References Cited

OTHER PUBLICATIONS

Jimin Liu et al: "RS sleep and wakeup in the MR cell", IEEE 802.16 Broadband Wireless Access Working Group, [Online] Jul. 2007, pp. 1-5, URL:http://ieee802.org/16/relay/contrib/c80216j-07_421.pdf, chapter 2.1.

Chinese Office Action mailed on Jun. 15, 2012 in China Patent Application No. 200880007660.5 (English Translation).

European Notice of Allowance mailed on Jun. 30, 2010 in European Patent Application No. 08730603.1.

International Search Report with Written Opinion for International Patent Application No. PCT/US2008/054836 mailed on Sep. 11, 2008.

Kang, H., et al., "Proposed Technical Requirements Guideline for IEEE 802.16 Relay TG," IEEE, Oct. 11, 2006 pp. 9.

Taiwanese Office Action mailed on Oct. 15, 2013 in Taiwan Patent Application No. 097108215 (English Translation).

\* cited by examiner

WIRELESS WIDE-AREA COMMUNICATION NETWORK MULTIHOP RELAY STATION MANAGEMENT

FIELD OF THE INVENTION

The present invention relates generally to the field of wireless communication systems, and more particularly, to wireless wide-area communication networks using multihop relay stations.

BACKGROUND OF THE INVENTION

Wireless wide-area communication networks are being proposed using multihop relay stations, such as that proposed for WiMAX networks, i.e. IEEE 802.16j. Such networks provide for the automatic transfer of wireless communication between a base station (access point) and a mobile station (terminal) using intermediate relay stations. It follows that there is a demand for an apparatus a method for automating a seamless transfer of such wireless communication.

Of course, it is presently known how to operate base stations and mobile stations in direct communication. But one of the problems encountered when performing a mobile multihop relay (MMR) wireless communication in a wireless Wide Area Network (WAN) is the lack of an optimal mechanism for managing the operation of the relay stations. For example, relay stations may be active or inactive, and it needs to be determined how to manage these relay stations during communication origination, termination, re-establishment, and handoff.

An active relay station (RS) with an active mobile station (MS) associated therewith can be viewed similarly to a base station (BS), and typical BS-to-BS handoff and MS origination, termination, and re-establishment algorithms can be re-used with slight modifications. However, there are technical challenges in when to inform the MS to handoff from a BS to an inactive RS, and how to turn on an inactive RS to assist the MS in call origination, termination, and re-establishment. In addition, channel quality estimation for both uplink (UL) and downlink (DL) channels between the MS and RS presents difficulties. For example, all DL related triggers cannot be used since an inactive RS will not be transmitting preamble or pilot bits, and the MS cannot report the DL channel quality between itself and an inactive RS. Moreover, base station neighbor lists would not include an inactive RS.

What is needed is an apparatus and method for managing a relay station, and particularly an inactive relay station, in a wireless WAN communication system.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENT

The present invention provides an apparatus and method for managing a relay station, and particularly an inactive relay station, in a wireless WAN communication system. To avoid unnecessary interference, the present invention proposes to have a Relay Station (RS) remain inactive or silent (e.g. not sending preamble, pilots or any other overhead but still listening for useful information) when there is no Mobile Stations (MS) under the RS. In addition, the inactive RS is managed to turn itself ON to assist in a handoff to itself, and in MS call origination and termination (e.g. paging). The present invention also provides a solution for problem of determining channel quality estimation for both uplink (UL) and downlink (DL) channels due to the inactive or silent RS.

Figure 1:
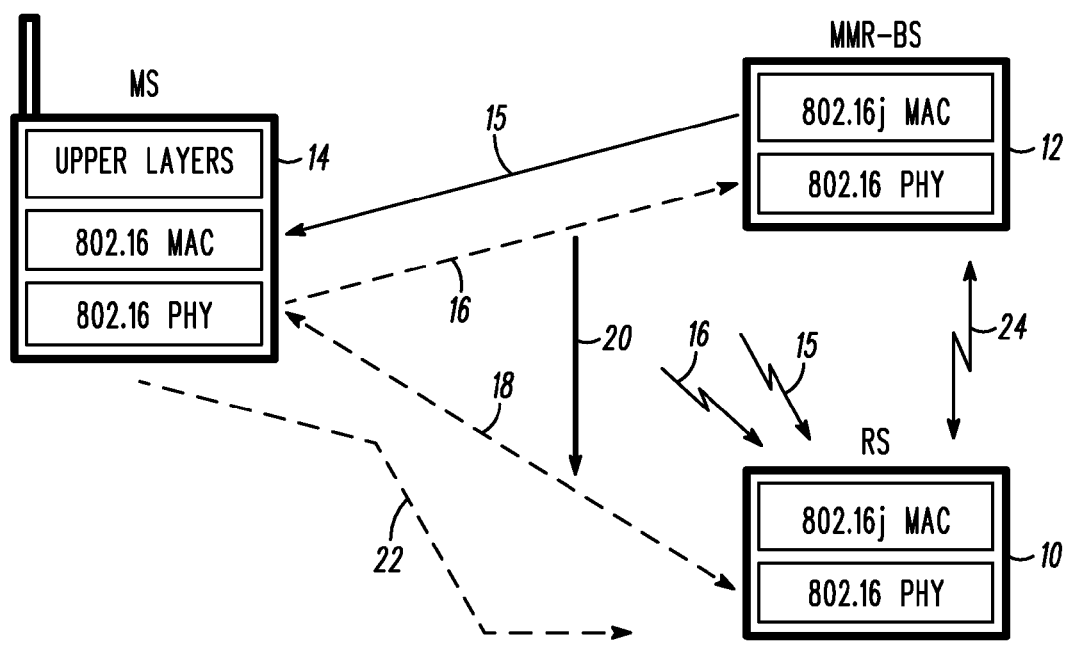
FIG. 1 shows a simplified block diagram for a multihop network, in accordance with the present invention.

Referring to FIG. 1, a wireless wide-area communication network with a Mobile Multihop Relays (MMR) includes at least one relay station 10 (RS) and at least base station 12 (BS) or access point, which can serve a plurality of mobile stations 14 (MS) or terminals. Other BSs (not shown) service other MSs (also not shown) in other sectors of the network. The relay stations relay communications 18, 24 between a MS and BS that are unable to communicate directly 15, 16. There may be multiple relay stations (one shown 10) in a communication link 18, 24 between a MS 14 and BS 12.

The relay station 10 and base station 12 are operable under MMR protocols (IEEE 802.16j), as are known in the art. The mobile station 14 is operable under more general wide-area network protocols (IEEE 802.16). The RS can be implemented with variable intelligences ranging from a dumb repeater terminal to an intelligent station essentially equivalent to a BS. Any particular RS is controlled by one BS, and multiple RSs can be in a communication link between an MS and BS.

The MS 14 includes a wireless IEEE 802.16 physical layer, IEEE 802.16 Media Access Control (MAC) layer, and higher upper control layers, known in the art, as part of its protocol stack to communicate with an RS or BS. The MMR-BS 12 also includes a wireless IEEE 802.16 physical layer, IEEE 802.16j MAC layer, and higher control layers (not shown), known in the art, as part of its protocol stack to communicate with an RS or MS. The RS also includes a wireless IEEE 802.16 physical layer and higher control layers (not shown) as are known in the art, and an IEEE 802.16j MAC layer in accordance with the present invention as will be described below. Alternatively, the higher control layers can be implemented in accordance with the present invention. The MAC layer tracks the quality of an RF link to an MS and also manages that link. Various quality metrics are known in the art and can include a measure of signal strength, signal-to-noise ratio (SNR), energy per bit, interference, retransmission requests, MCS, Quality of Service (QoS), channel quality indicator (CQI), among others, that are generally grouped herein under the term "channel quality".

The present invention provides a relay station with an improved Media Access Control (MAC) or higher control layer that can provide lower interference by maintaining transmitter silence when not serving any mobile stations. The lower interference can result in improved network performance and lower latency (i.e. delay) that are convenient for the physical layer. This is important for low-latency tolerant traffic such as Voice over Internet Protocol (VOIP) or video.

The relay station monitors nearby communications from either or both of nearby MSs, RSs, and BSs in order to determine when to activate its transmitter signals. As described herein, the communication network uses an Orthogonal Frequency Division Multiple Access (OFDMA) system for WiMAX IEEE 802.16j communication systems. However, it should be recognized that the present invention is applicable to any communication system, such as Time Division Duplex (TDD) communication systems, Frequency Division Duplex (FDD) communication system, and the like.

In operation, a BS broadcasts downlink frames 15 that contain a preamble, a Frame Control Header (FCH), and a downlink (DL) burst that, among other information, contains control information, which includes a downlink map (DL-MAP) and uplink map (UL-MAP) that allocate communication slots in succeeding or future downlink and uplink subframes for mobile stations to use for communicating with the BS. Each MS also examines the broadcast downlink frame to distinguish whether packet data units are addressed thereto, and retrieves any data addressed to that MS.

In the uplink 16, the BS has defined the number and position of time slots that each MS is allowed to transmit in an uplink subframe in the UL-MAP. The MS can then insert data into the frames in an amount and position that the BS has established. The uplink subframes can include; CQI information, an ACKnowledge (ACK), a NotACKnowledge (NACK) or retransmission request (ARQ or hybrid-ARQ), a ranging request, and bandwidth request, and most UL bursts. It should be noted that for the uplink and downlink operations described above, the RS can serve in the same role as described for the BS.

In accordance with the present invention, a RS is turned off, inactivated, or kept silent (i.e. no transmit signals are allowed) to lower interference in the network. However, the receiver portion of the RS is kept active to monitor nearby signals. This is accomplished by the RS first determining whether any mobile stations are being served by the relay station. If no mobile stations are being served by the relay station, the relay station is inactivated, defined by; inactivating transmitted signals from the relay station, leaving a receiver active, and monitoring signals on the active receiver.

A problem then arises since the RS is sending no signals, in that, all downlink related handoff triggers cannot be used since an inactive RS will not transmit preamble(s) or pilots, and MS cannot report the DL channel quality between itself and an inactive RS. In addition, the inactive RS will not appear in a neighbor list as a candidate for handover.

The present invention resolves this problem by having the receiver of the inactive relay station monitor nearby signals and activating the relay station when the monitored signals indicate that the relay station can serve a communication of a nearby mobile station. The received signals can include downlink signals of nearby BSs and/or RSs that can include a UL-MAP. The received signals can also include uplink signals of nearby MSs and can include at least a CQI, ACK/NACK, and retransmission requests, or other quality indicators. Of course, some MSs that are too far away from the RS may not be heard by the RS, but then these MSs are unlikely candidates for service by the RS.

From a monitored UL-MAP, the inactive RS can identify the Modulation and Coding Scheme (MCS) of each potential MS that can be handoff to itself as well as estimation of their path loss. The knowledge of the MCS is used to infer channel quality, inasmuch as an MS using a lower data rate MCS can be assumed to be experiencing poor channel quality, necessitating the use of that MCS. Similarly, channel quality is directly related to path loss, wherein the path loss of an MS can be estimated by a signal strength received by the monitoring inactive RS divided by the power control bits that have been sent to the MS by its serving RS/BS. In addition, the inactive RS can further estimate the uplink channel quality of some or all MSs identified in the UL-MAP from their associated pilot subcarriers (PUSC), which carries a channel quality indicator (CQI). Alternatively, channel quality can be determined or calculated by other available means approximating an interference or noise calculation such as carrier/interference ratio, signal-to-noise ratio, etc.

Given this information, the present invention provides a technique to re-activate the inactive RS in order to serve one or more nearby MSs with a handoff (20 FIG. 1). The inactive RS monitors the transmit power of nearby MSs and BSs. The signal strength from a MS or BS can be directly measured by the RS, and the MSs are sorted by their path loss value. The path loss between an MS and its serving BS can only be inferred by a signal strength received by the monitoring inactive RS divided by the power control bits that have been sent to the MS by its serving BS. From these measurements and calculations, the RS can determine a MS-to-RS path loss and a MS-to-BS path loss from the sorted MSs. If a MS has much less path loss to its BS than the inactive RS, then it is not a candidate for handoff. However, if the path losses approach the same value, the MS can be identified as a handoff candidate. The exact threshold for becoming a handoff candidate can be controlled in the field by a static or dynamic margin or hysteresis as follows:

$$\text{if (MS-to-RS path loss<MS-to-BS path loss+Margin)} \qquad (1)$$

where those top N sorted MSs satisfying the above relationship are placed in a "better server pool" as candidate for handoff to the inactive RS. The value of Margin and N can be determined empirically.

Preferably, the MS in the better server pool of the inactive RS are then sorted by channel quality. For example, the MSs can be sorted by CQI and/or MCS, where those MSs with poor CQI or a low data rate MCS (indicating poor channel quality) would be given a higher weighting as a handoff candidate. In another example, if the inactive RS detects high retransmission activity for an MS, this can be an indicator of degraded channel quality and this MS would be given a higher weighting as a handoff candidate. Specifically, if a MS is getting a DL burst for a HARQ retransmission period (default: 4 frames), it is probable that the MS is experiencing poor channel conditions and could be a handoff candidate.

Optionally, the weighting can be affected by other parameters. For example, a mobile that has been stable and visible to the RS can be given a higher weighting since a stable subscriber is a desirable for a server. In another example, if a signal strength of a MS increases over time, this is a possible indication that the MS is moving away from the BS and towards the RS (22 in FIG. 1), wherein a higher weighting is given this MS as a possible handoff candidate.

In any of the above scenarios, the N listed MSs of the "better server pool" are weighted and sorted for poorest channel quality and/or best handoff candidate. The inactive RS then calculates if any of these MSs would benefit from improved channel quality by handing off to the RS. In particular, the RS can sum the offsets or differences in the path losses from Eq. 1 (i.e. MS-to-RS path loss and MS-to-BS path loss) for each MS. In addition, the weightings and other parameters described above can be taken into consideration as further corrected offsets. The offsets are summed to provide an estimated channel quality improvement that can be provided for each MS by handoff to the RS.

The channel quality improvement for each MS is then compared against a TurnOnThreshold to determine whether the RS should activate itself. The TurnOnThreshold for activating the RS can be static or dynamic, and can be determined empirically in the field. In particular, if the Improvement>TurnOnThreshold for any of the NMSs, the RS will activate all its functions and proceed with the handoff of those particular MSs meeting the above criteria by sending a handoff request message to the serving BS or RS to transfer the MS to the RS. However, if the Improvement<TurnOnThreshold for all of the N MSs, the RS will remain inactive. Preferably, once an RS activates itself and needs to hop through other inactive RS to reach the BS, it should also direct all of its uplink path RSs to activate.

Once an RS is active, the RS can measure the actual interference contribution of its activity compared to a prior CQI average. If the measured active interference is worse than the interference when the RS was inactive, be a predetermined amount, the RS will proceed to clear itself of served MSs. Once the RS is no longer serving any MSs, the RS can proceed to inactivate itself.

In another embodiment of the present invention, the technique of activating an RS can also be used for an MS that is originating or re-establishing a communication link. In this embodiment, an inactive RS monitors a power level of a ranging and/or bandwidth request made by nearby mobile stations. If a request is above a predetermine power threshold, the RS will first list that MS as a potential candidate for service. If subsequent monitoring of power levels of a ranging and bandwidth request indicates that that same MS is making repeated (i.e. a predetermined number of) requests for the same service, then it is likely that that same MS would benefit from being served by the RS. In this case, the RS can activate itself to serve the MS and relay the last MS transmission to the BS for proper processing of the request.

In yet another embodiment of the present invention, the technique of activating an RS can also be used for an MS that is terminating a communication link. In this embodiment, an inactive RS again monitors paging requests of an MS. If the same MS is making repeated (i.e. a predetermined number of) paging requests, then it is likely that the BS can not hear the MS and that the same MS would benefit from being served by the RS. In this case, the RS can activate itself to serve the MS and relay the last MS transmission to the BS for proper processing of the paging request. Optionally, the RS can also monitor path loss and channel quality as was done in the handoff embodiment above and only activate if the MS also in the RS "better server pool". Alternatively, the RS can also monitor ranging and bandwidth request as was done in the originating/re-establish embodiment above and only activate if the MS if a power level of the ranging or bandwidth request is above a predetermine power threshold. Preferably, it is desired to periodically flush the list of potential candidates for service or handoff.

Figure 2:
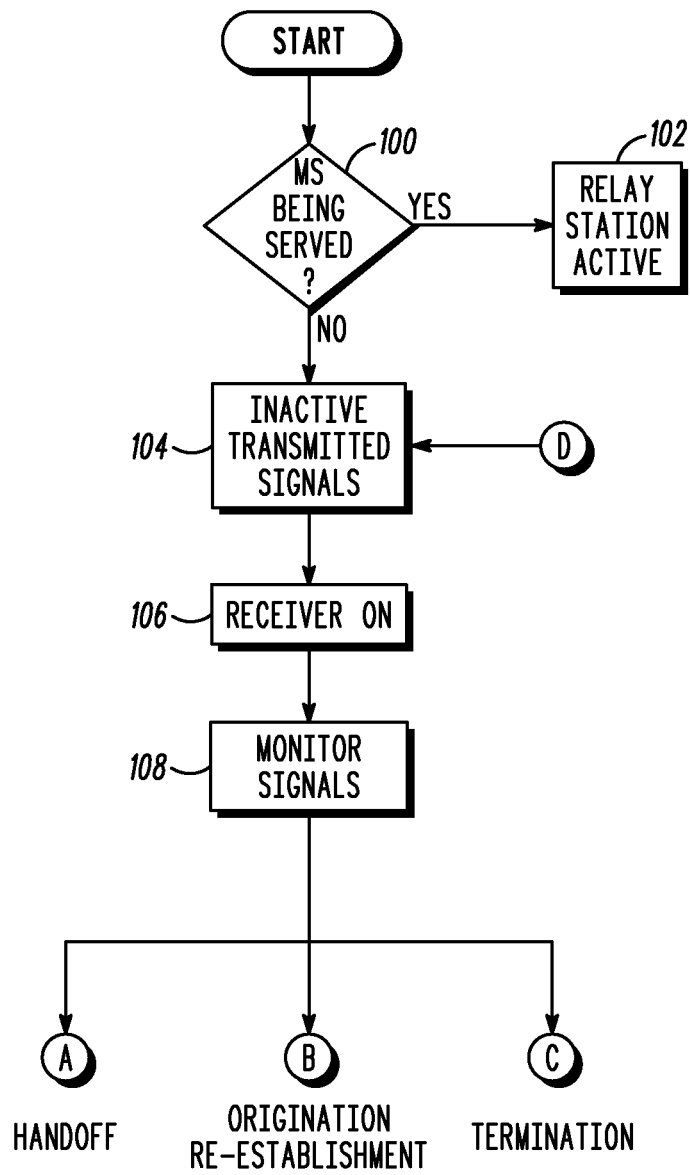
FIG. 2 shows a flow diagram for inactivation of a relay station, in accordance with the present invention.

Referring to FIG. 2, the present invention also provides a method for managing a multihop relay station in a wireless wide-area communication network. The method is provides for operating the relay station in call handoff, call origination/re-establishment, and call termination. In addition, the method includes processes for activating and inactivating the relay station. In the most general embodiment for inactivating the relay station, the method includes a first step of determining 100 whether any mobile station (MS) is being served by the relay station (RS). If there is any MS being served the RS, then the RS is to remain active 102. However, if there are no MSs being served by the RS, the method inactivates the RS by; inactivating 104 transmitted signals from the relay station, leaving 106 a receiver active, and monitoring 108 signals on the active receiver. As should be recognized, inactivating 104 transmitted signals can be accomplished in various ways as long as the end result prevents any transmissions that might cause interference from the RS. Preferably, the step of monitoring 108 also includes detecting whether a monitored signal strength of a mobile station increases over time (i.e. the MS is approaching the RS), whereupon an increased weighting can be applied for that mobile station as a potential handoff candidate. In addition, the step of monitoring 108 can also includes detecting retransmission signals (i.e. the MS is having difficulty communicating with its serving BS), whereupon an increased weighting can be applied for that mobile station as a potential handoff candidate.

Figure 3:
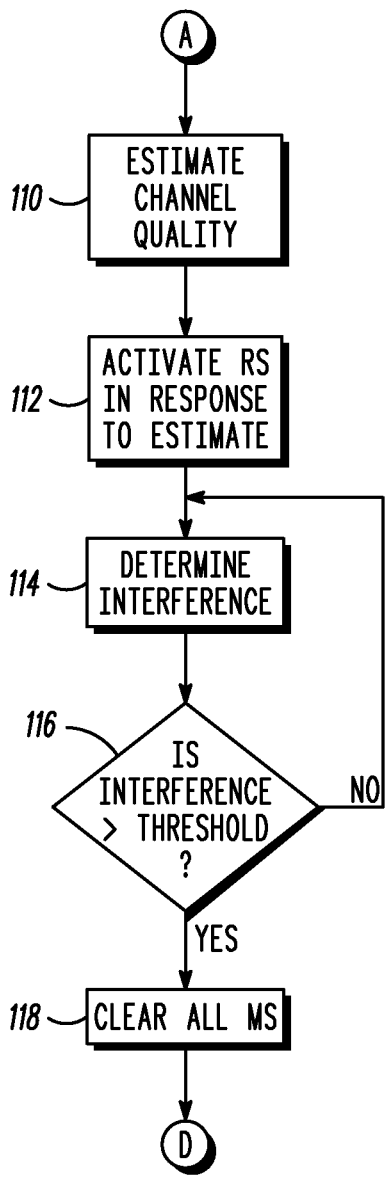
FIG. 3 shows a flow diagram for activating a relay station for call handoff, in accordance with the present invention.

Referring to FIGS. 2 and 3, a first embodiment for activating the RS involves a handoff of an active MS. In this embodiment, the inactive RS estimates 110 a channel quality of at least one mobile station from the monitored signals. A next step includes activating 112 the relay station in response to the monitored signals indicating that a channel quality of the mobile station will improve when being served by the relay station. The estimating step 110 can include identifying a modulation and coding scheme (MCS) from the monitored signals and estimating an associated channel quality therefor. If a MS is using a low coding rate this is typically due to poor channel conditions. Therefore, knowing a MCS can directly relate to channel quality. The estimating step 110 can also include estimating path losses of the monitored signals between the mobile station and base station and between the mobile station and relay station. The actual determination of path losses has been described previously. In the case of path losses, the activating step 112 would include includes activating the relay station if an improvement in path loss for any mobile station using the relay station over using the base station is greater than a predetermined threshold (see Eq. 1). In any event, the activating step 112 includes performing the necessary communication with the serving BS to perform a handoff of the MS to the RS. In addition, it is preferred that once an RS is activated 112, the RS directs the turning on of all uplink path multihop relay stations needed for the MS communication to reach a base station.

Once the RS is active, a next step includes determining 114 whether the activated relay station results in more than a predetermined amount of interference. Determining the interference from signals is well known in the art, and any of those known techniques can be used in this instance. If it is determined 116 that the activated relay station results in more than a predetermined amount of interference, the RS will proceed to clear 118 all mobile stations from service by the relay station, and then inactivating 104, 106, 108 the relay station as before. Otherwise, the RS remains active and interference is periodically determined 114.

Figure 4:
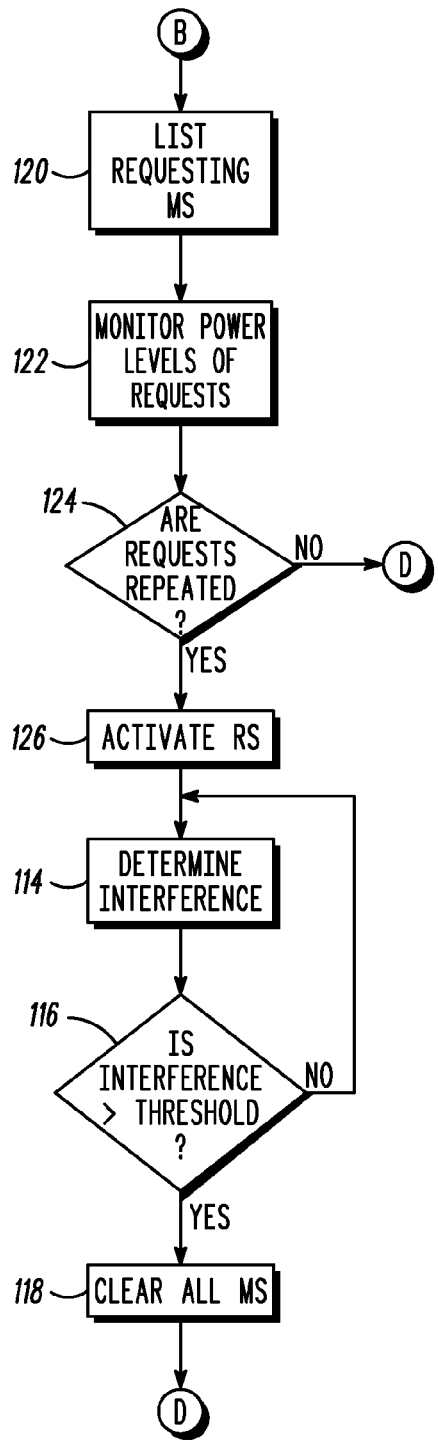
FIG. 4 shows a flow diagram for activating a relay station for call origination/re-establishment, in accordance with the present invention.

Referring to FIGS. 2 and 4, a second embodiment for activating the RS involves a call origination or re-establishment of a MS. In this embodiment, the inactive RS monitor 108 a power level of at least one of a ranging request and a bandwidth request made by a mobile station trying to originate or re-establish a call. In this embodiment, the RS will list 120 a mobile station as a potential candidate for service from the relay station if the request is above a predetermine power threshold. The RS will subsequently monitor 122 power levels of a ranging and bandwidth requests to detect whether the mobile station is repeating requests for the same service. If repeated requests are detected 124 (i.e. a BS is not responding), the RS can then activate itself 126 to serve the mobile station, which includes performing the necessary communication with the serving BS to complete the call origination or re-establishment of the MS. Otherwise, the RS remains inactive.

As in the first embodiment, once the RS is active, a next step includes determining 114 whether the activated relay station results in more than a predetermined amount of interference. Determining the interference from signals is well known in the art, and any of those known techniques can be used in this instance. If it is determined 116 that the activated relay station results in more than a predetermined amount of interference, the RS will proceed to clear 118 all mobile stations from service by the relay station, and then inactivating 104, 106, 108 the relay station as before. Otherwise, the RS remains active and interference is periodically determined 114.

Figure 5:
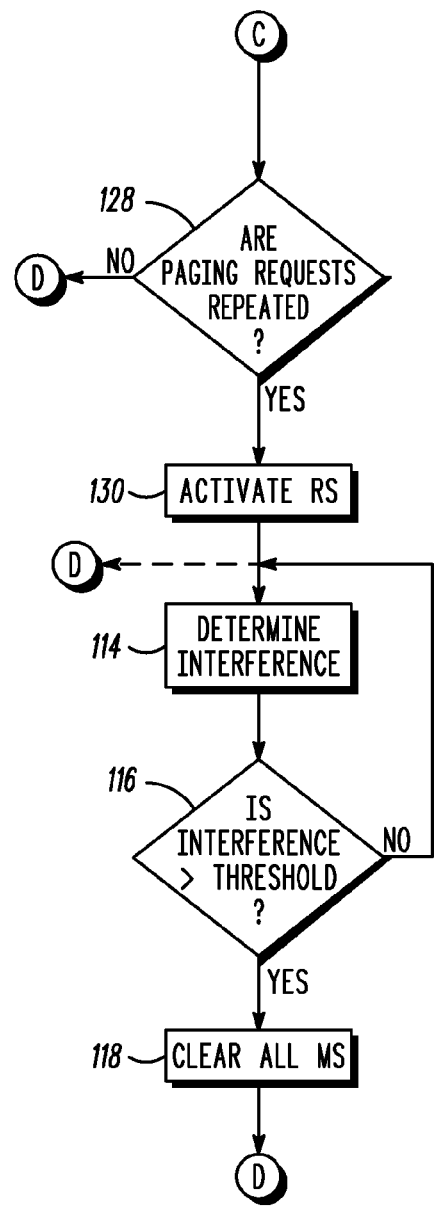
FIG. 5 shows a flow diagram for activating a relay station for call termination, in accordance with the present invention.

Referring to FIGS. 2 and 5, a third embodiment for activating the RS involves call termination. In this embodiment, the inactive RS monitors 108 paging requests for termination made by a mobile station. If repeated paging requests are detected 128 (i.e. a BS is not responding), the relay station can activate itself 130 to serve the mobile station, which includes performing the necessary communication with the serving BS to complete the call termination of the MS. Otherwise, the RS remains inactive.

If only one MS was being served and has terminated its call, the RS can immediately proceed to deactivate itself. Alternatively, as in the first embodiment, once the RS is active, a next step can include determining 114 whether the activated relay station results in more than a predetermined amount of interference. Determining the interference from signals is well known in the art, and any of those known techniques can be used in this instance. If it is determined 116 that the activated relay station results in more than a predetermined amount of interference, the RS will proceed to clear 118 all mobile stations from service by the relay station, and then inactivating 104, 106, 108 the relay station as before. Otherwise, the RS remains active and interference is periodically determined 114.

Advantageously, the present invention allows an inactive RS to remain OFF (i.e. it can hear but not talk) to avoid generating unnecessary interference when no active MS is associated with it. It also enables the RS to be turned ON to enable qualified active MSs to be handed over to itself, as well as assisting MS origination, re-establishment, and/or termination.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. In a wireless wide-area communication network with multihop relay stations, a method of managing a multihop relay station comprising the steps of:
   determining that no mobile stations are being served by the relay station;
   inactivating transmitted signals from the relay station, leaving a receiver active, and monitoring signals on the active receiver;
   estimating a channel quality of at least one mobile station not being served by the relay station from the monitored signals by the inactive relay station; and
   activating the relay station in response to the monitored signals indicating that a channel quality of the mobile station will improve when being served by the relay station;
   wherein the estimating step includes estimating path losses of the monitored signals between the mobile station not being served by the relay station and a base station and between the mobile station not being served by the relay station and the relay station.

2. The method of claim 1, wherein the estimating step includes identifying a modulation and coding scheme (MCS) from the monitored signals and estimating an associated channel quality therefor.

3. The method of claim 1, wherein the activating step includes activating the relay station if an improvement in path loss for any mobile station using the relay station over using the base station is greater than a predetermined threshold.

4. The method of claim 1, further comprising the steps of:
   determining whether the activated relay station results in more than a predetermined amount of interference, whereupon clearing served mobile stations from the relay station, and inactivating the relay station.

5. The method of claim 1, wherein if the step of monitoring detects whether a monitored signal strength of a mobile station not being served by the relay station increases over time, whereupon an increased weighting can be applied for that mobile station as a potential handoff candidate.

6. The method of claim 1, wherein if the step of monitoring detects retransmission signals for a mobile station, whereupon an increased weighting can be applied for that mobile station as a potential handoff candidate.

7. The method of claim 1, wherein the step of activating includes turning on all uplink path multihop relay stations needed for a mobile station communication to reach a base station.

8. The method of claim 1, wherein monitoring step includes monitoring a power level of at least one of a ranging request and a bandwidth request made by a mobile station not being served by the relay station, and further comprising the steps of:
   listing a mobile station as a potential candidate for service from the relay station if the request is above a predetermine power threshold;
   subsequent monitoring of power levels of a ranging and bandwidth requests to detect whether the mobile station is repeating requests for the same service; and
   activating the relay station to serve the mobile station if repeated requests are detected.

9. The method of claim 1, wherein monitoring step includes monitoring paging requests made by a mobile station not being served by the relay station, and further comprising the step of activating the relay station to serve the mobile station if repeated paging requests are detected.

10. A multihop relay station in wireless wide-area communication network, the relay station comprising: a transmitter; a receiver for monitoring signals; and
   a media access controller (MAC) that determines any that no mobile stations are being served by the relay station, whereupon the MAC inactivates the transmitter, leaving the receiver active, and monitoring signals on the active receiver;
   wherein the media access controller estimates a channel quality of at least one mobile station not being served by the relay station from the monitored signals by the receiver, and activates the relay station in response to the monitored signals indicating that a channel quality of the mobile station will improve when being served by the relay station;
   wherein the media access controller estimates path losses of the monitored signals between the mobile station not being served by the relay station and a base station and between the mobile station not being served by the relay station and the relay station.

11. The relay station of claim 10, wherein the media access controller activates the transmitter if an improvement in path loss for any mobile station using the relay station over using the base station is greater than a predetermined threshold.

* * * * *